United States Patent [19]

Steinhorn

[11] Patent Number: 5,463,615
[45] Date of Patent: Oct. 31, 1995

[54] NODE FAILURE RESTORATION TOOL

[75] Inventor: Daniel Steinhorn, Holmdel, N.J.

[73] Assignee: AT&T Corp., Murray Hill, N.J.

[21] Appl. No.: 271,931

[22] Filed: Jul. 7, 1994

[51] Int. Cl.[6] ............................... H04J 3/14; G06F 11/00
[52] U.S. Cl. ............................. 370/16; 370/54; 379/221; 340/827; 395/182.02
[58] Field of Search .................................. 370/13, 14, 16, 370/54, 58.1, 58.2, 58.3, 60, 85.13, 94.1, 94.3; 379/219, 220, 221, 271, 272, 273; 340/825.03, 826, 827; 371/8.1, 8.2, 11.1, 11.2

[56] References Cited

U.S. PATENT DOCUMENTS

| | | | |
|---|---|---|---|
| 4,853,927 | 8/1989 | Wenzel | 370/16 |
| 4,956,835 | 9/1990 | Grover | 370/16 |
| 4,991,204 | 2/1991 | Yamamoto et al. | 379/221 |
| 5,031,093 | 7/1991 | Hasegawa | 370/16 |
| 5,058,105 | 10/1991 | Mansour et al. | 370/16 |
| 5,146,452 | 9/1992 | Pekarske | 370/16 |
| 5,182,744 | 1/1993 | Askew et al. | 370/16 |

*Primary Examiner*—Alpus Hsu

[57] ABSTRACT

A failed network node is restored by specifying a number of facility transfer nodes and restoration nodes within any area of a network node, determining a given facility transfer node and a given restoration node to use in an area so that the total distance from each node in the area to the given facility transfer node and given restoration node is minimized, performing restoration in the event of node failure by bringing access traffic for the failed node to the given facility transfer node and then from the given facility transfer node to the given restoration node, bringing traffic from other network nodes which cross-connects with the access traffic to the failed node's restoration node, and determining the restoration paths so that a minimum number of restoration links are used.

8 Claims, 3 Drawing Sheets

NODE FAILURE RESTORATION TOOL

FIELD OF THE INVENTION

This invention relates to telephone networks, and particularly to methods and means for dynamically establishing the most cost-effective network architecture to restore traffic accessing on a telephone network at a node which has failed.

BACKGROUND OF THE INVENTION

A telephone network must provide restoration of traffic accessing the network at a node which has failed. A node may for example be a lightwave system terminating point of links on a telephone transmission network. U.S. Pat. No. 5,182,744, discloses a system for restoring traffic. However, this and other prior systems have limitations in the degree to which they restore traffic which accesses the networks at failed nodes, and in the manner they optimize the costs involved in obtaining various levels, such as percentages, of restoration within any given time.

SUMMARY OF THE INVENTION

According to an aspect of the invention, the most cost-effective method and means of providing restoration at a node involves specifying a number of facility transfer nodes and restoration nodes within any area of a network node, determining the particular facility transfer nodes and restoration nodes to use in an area so that the total distance from each node in the area to its facility transfer node and restoration node is minimized, performing restoration in the event of node failure by bringing its access traffic to its facility transfer node, and then from its facility transfer node to its restoration node, bringing traffic from other network nodes which cross-connects with this access traffic to the failed node's restoration node, and determining the restoration paths so that the smallest number of restoration links are used.

Facility transfer nodes are nodes to which access traffic is diverted when the normally used network node fails. Restoration nodes are where the diverted access traffic is cross-connected to the same network facilities to which they were cross-connected during non-failure operation.

These and other aspects of the invention are pointed out in the claims. Objects and advantages of the invention will become evident from the following detailed description of a preferred embodiment of the invention when read in light of the accompanying drawings.

DETAILED DESCRIPTION OF PREFERRED EMBODIMENTS

Figure 1:
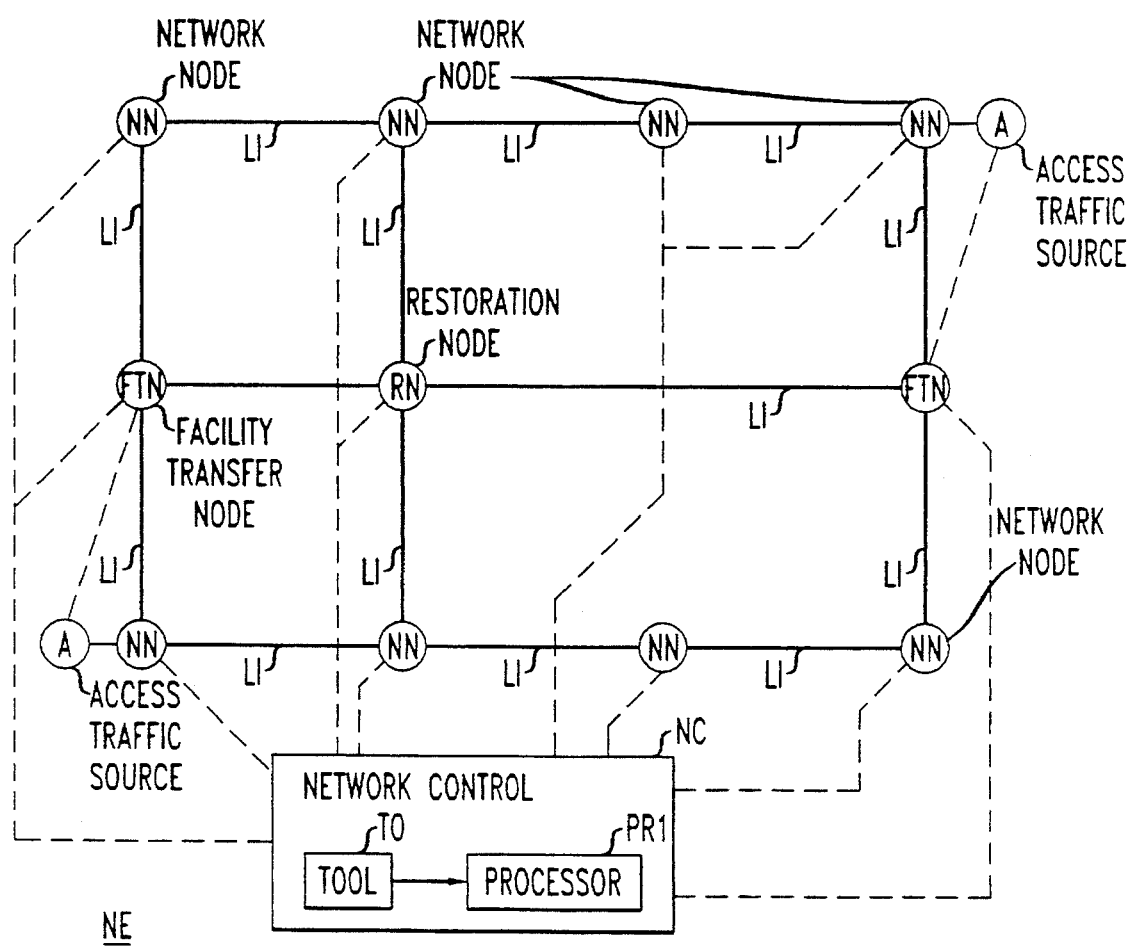
FIG. 1 is a block diagram of a network embodying features of the invention.

In the block diagram of FIG. 1, a network NE includes a number of traffic sources TS which pass, by means of links LI, through a number of network nodes NN. A multiplicity of facility transfer nodes FTN and restoration nodes RN, all connected by links LI, serve to route traffic in the event of a failure of a network node NN. Facility transfer nodes FTN are nodes to which access traffic is diverted when the normally used network node fails. Restoration nodes RN are where the diverted access traffic is cross-connected to the same network facilities to which they were cross-connected during non-failure operation. A network control NC includes a node failure restoration tool TO that communicates with processors in the nodes NN, FTN, and RN to direct operation of the nodes. While only a few nodes are illustrated, these represent but a small portion of the nodes NN, FTN and RN in the network NE.

Figure 2:
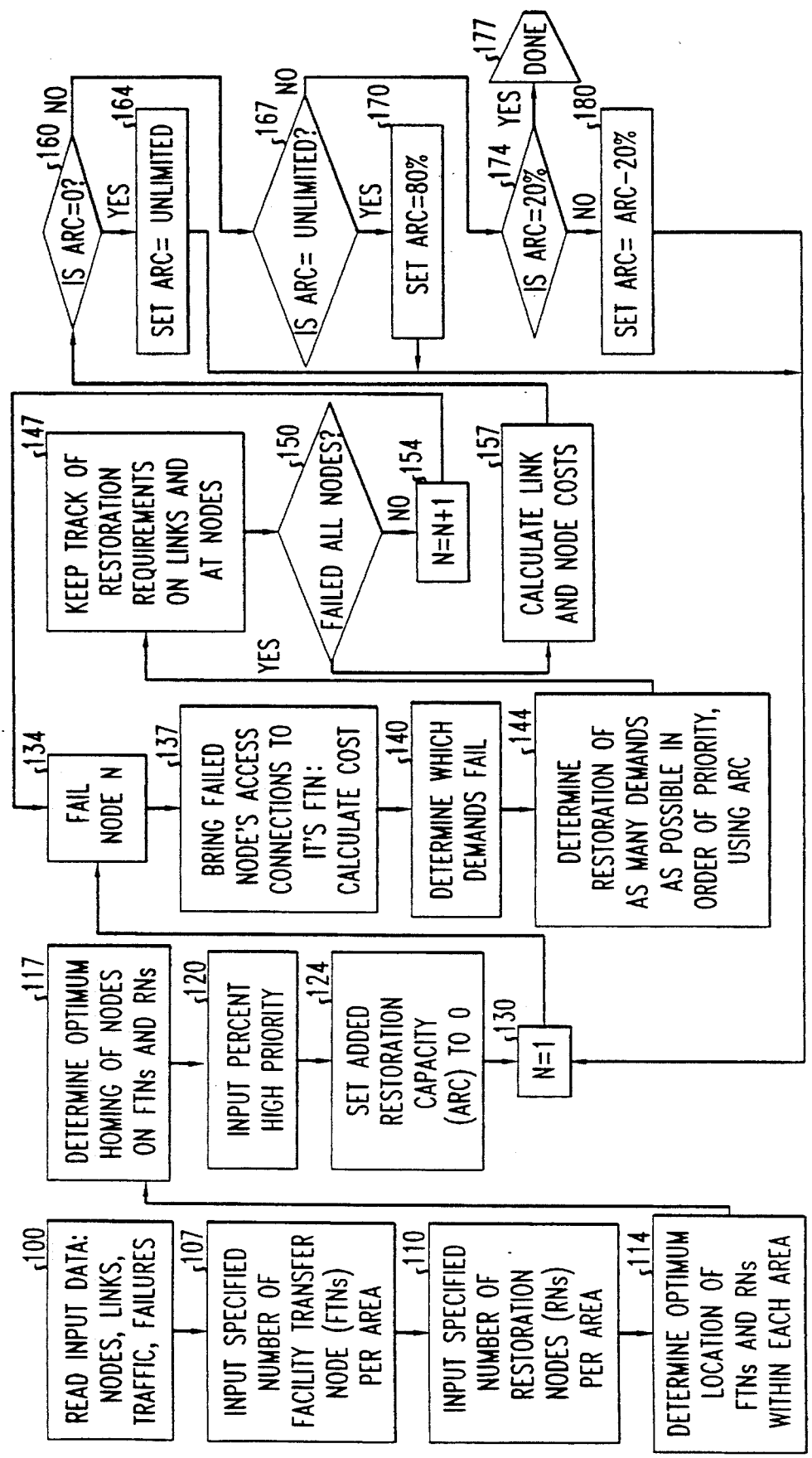
FIG. 2 is a flow chart illustrating the operation of a a node failure restoration tool in FIG. 1 to determine the optimum number and location of facility transfer nodes and restoration nodes and embodying aspects of the invention.

FIG. 2 is a node failure recovery flow chart of the operation of the node failure restoration tool TO to determine the optimum number and location of facility transfer nodes and restoration nodes, and the amount and cost of restoration facilities to provide various levels of restoration. The tool TO is a processor that makes determinations from input data. In step 100 of FIG. 2, tool TO in the network control NC reads input data, for example, nodes NN and FTN and RN, links LI, traffic, and failures. The input data is manually fed into the tool TO. According to an embodiment of the invention, the tool TO receives the data automatically from the processor PR1 or from the network. In step 107 it specifies the number of facility transfer nodes FTN per area, and in step 110, the number of restoration nodes RN per area. In step 114, it determines the optimum locations of facility transfer nodes FTN and restoration nodes RN within each area. In step 117 it determines the optimum assignment of network nodes NN on transfer nodes FTN and restoration nodes RN. In step 120 it reads what percent of the input is high priority, and in step 124 it sets the added restoration capacity to 0.

The tool TO hypothetically sets a network node NN to N=1 in step 130 and selects a network node to fail in step 134. In step 137 it brings the failed node's access connections to its facility transfer node and determines the cost. In step 140 it determines which demands would fail. In step 144, it restores as many demands as possible in order of priority using the added restoration capacity. In step 147 it keeps track of the restoration requirements on links LI and at nodes NN. In step 150 it asks if all nodes NN have been failed. If no, in step 154, it increments N=N+1 and returns to step 134. If yes, in step 157, it determines the link and node costs.

In the next step 160, the tool TO asks if the added restoration capacity is 0. If yes, in step 164, it sets the added restoration capacity to unlimited and returns to step 130. If no, in step 167, it asks if the added restoration capacity is unlimited. If yes, in step 170, it sets the added restoration capacity to a high percentage, such as 80%, and returns to step 130. If no, in step 174, it asks if the added restoration capacity is a low percentage, such as 20%. If yes, in step 177, the process ends. If no, in step 180 it decrements the added restoration capacity by 20%, and the process returns to step 130.

The tool TO determines the optimum number of facility transfer nodes FTN, the optimum number of restoration nodes RN, the location of these nodes, the assignment of these nodes to failed nodes, and plots a curve showing the relationship between restoration cost and percent restoration of access traffic achieved. Restoration cost includes access tariff costs, network transmission costs, plus cross-connect costs at the facility transfer and restoration nodes FTN and RN.

The tool TO receives an input which specifies areas of the network (e.g. states, groups of states, or portions of states) and number of facility transfer nodes FTN and restoration nodes RN within each area. The tool then determines the specific facility transfer nodes FTN to use within each area so that the total distance from each node NN in the area to its facility transfer node FTN is minimized. A similar determination is done for restoration nodes RN.

Once the tool TO has determined the optimum number and location of facility transfer nodes and restoration nodes, and the required restoration facilities, the processor PR1 can perform restoration when a node fails by bringing its access traffic to a close facility transfer node FTN, and then from its facility transfer node FTN to its restoration node RN. At the same time, traffic from other network nodes NN which cross-connects with this access traffic is also brought to the failed node's restoration node RN. The tool processor PR1 determines the restoration paths and capability in order of priorities, and for a particular demand, the restoration path is determined so that the smallest number of restoration links are used. Path restoration (as opposed to line restoration) is used, centralized (rather than distributed) restoration is used, and when restoring a particular demand, links LI which were used during normal (non-failure) operation may be reused for restoration.

Figure 3:
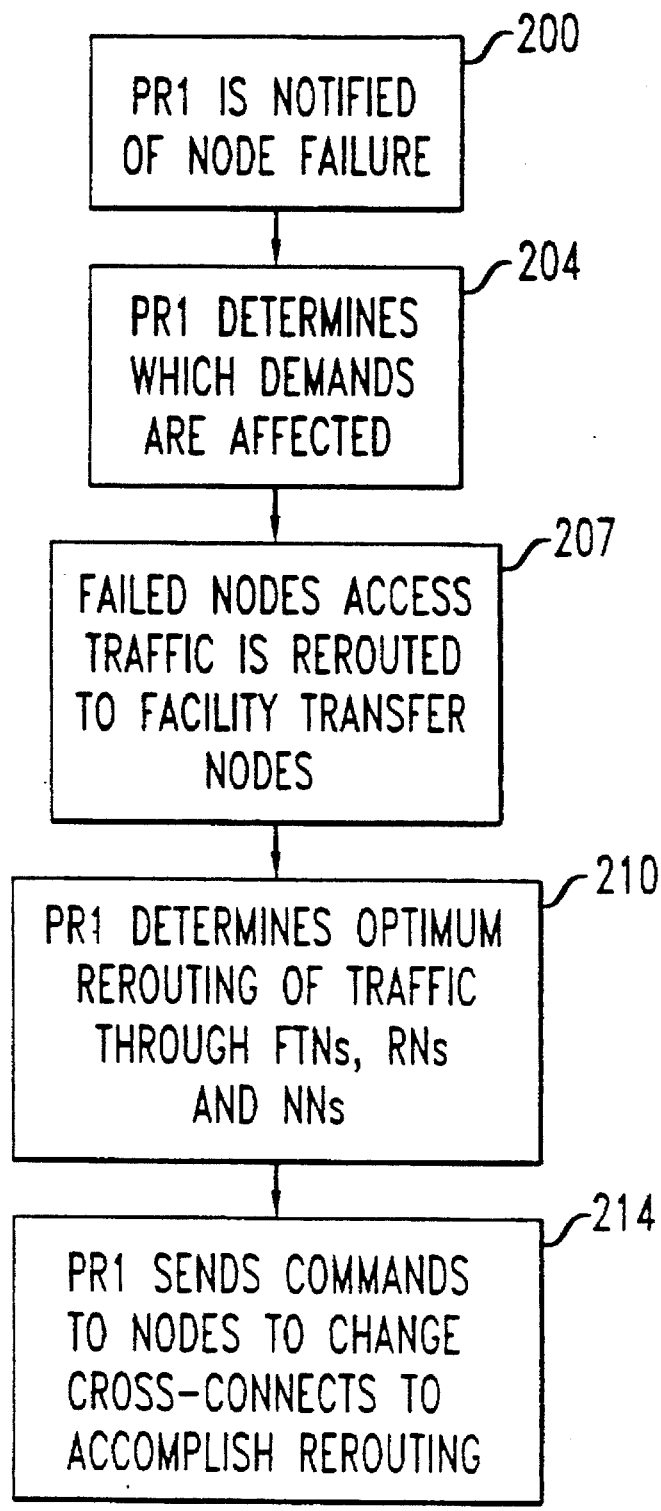
FIG. 3 is a flow chart of the operation of a processor which has received information from the tool in FIG. 1 and responds to the operation shown in FIG. 2, in accordance with another aspects of the embodiment of the invention.

FIG. 3 is a flow chart of the operation of the processor PR1 which has received the information from the tool TO and operates on that information. Here, when a node failure occurs, the processor PR1 is notified in step 200. In step 204, the processor PR1 determines which demands are affected. In step 207, the failed node's access traffic is rerouted to the facility transfer nodes. In step 210, the processor PR1 determines the optimum rerouting of traffic through nodes FTN, RN, and NN. In step 214, the processor PR1 then sends commands to the nodes to change cross connects and links to accomplish the routing.

A type of restoration is described in U.S. Pat. No. 5,182,744. There, the input specifies restoration capacity on each network link LI, which has previously been supplied to provide restoration for link failures. When a node NN fails, the first thing the tool does is interpret the node failure as failures of all the links LI into that node. The previously supplied restoration capacity is then used to restore as much of the through traffic (through the failed node) as possible. The unused portion of this restoration capacity can then be used to restore as much of the failed node's access traffic as possible. The amount of the access traffic which can be restored in this way represents the access traffic restorability without adding any transmission capacity.

The tool TO determines the minimum amount of network transmission capacity necessary to restore 100% (or the maximum possible amount, due to network connectivity considerations) of the access traffic. The tool determines what percent of the access traffic can be restored when different levels of network restoration transmission capacity are supplied. The total restoration cost includes the access tariff costs, the network costs, and the cross-connect costs at the facility transfer nodes FTN and restoration nodes RN. It is assumed that only one node failure will occur at a time. Hence, the network costs for each link and the cross-connect costs at each node are the maximum requirement at that link or node due to any one node failure.

The tool utilizes the system in U.S. Pat. No. 5,182,744. The latter serves for link failures, and determines required network transmission restoration capacity under the assumption that one link will fail at a time. The processor PR1 adds node failure restoration by taking into account that when a node fails, all the links into the node will fail, and determines the required network restoration transmission capacity accordingly.

The processor PR1 enhances the system in U.S. Pat. No. 5,182,744 which deals with restoring traffic already on the network by adding restoration dealing with traffic accessing the network at the failed node, in addition to traffic already on the network.

Rather than assuming it is the only restoration system operating in the network, the processor PR1 provides node failure restoration and determines additional network capacity requirements and costs to restore various percentages of access traffic.

The processor PR1 is concerned with access traffic as well as network traffic, which requires the determination of the optimum number, location and assignment of these nodes.

The benefits of the node failure restoration Tool include the possibility of providing 100% or X% of access traffic to all customers, or X% restoration for a particular node failure, or X% restoration to a particular customer or group of customers on the basis of payments for those purposes. The costs can be adjusted to provide these various levels of access restoration.

The invention furnishes virtually guaranteed services, despite disasters that might interrupt service, to those customers that demand such guarantees.

While embodiments of the invention have been described in detail, it will be evident to those skilled in the art that the invention may be embodied otherwise without departing from its spirit and scope.

What is claimed is:

1. A node failure restoration method, comprising the steps of:

specifying a number of facility transfer nodes and restoration nodes within any area of a network node, determining a given facility transfer node and a given restoration node to use in an area so that the total distance from the network node in the area to the given facility transfer node and given restoration node is minimized, performing restoration in the event of a network node failure by bringing access traffic for the failed network node to the given facility transfer node and then from the given facility transfer node to the given restoration node, bringing traffic from other network nodes which cross-connects with the access traffic to the failed network node's restoration node, and determining the restoration paths so that a minimum number of restoration links are used.

2. A node failure restoration method as in claim 1, wherein the step of performing includes the steps of indicating the failed network node as failures of all the links to the failed network node, and restoring as much of the traffic through the failed network node with a predetermined use of reserve capacity.

3. A node failure restoration method as in claim 2, wherein the predetermined use of reserve capacity is established on the basis of customer agreement.

4. A node failure restoration method as in claim 1, wherein the step of performing includes the steps of testing for use of an established predetermined reserve capacity and restoring as much of the traffic through the failed network node within the established predetermined reserve capacity.

5. A network, comprising:

a plurality of traffic sources, a plurality of network nodes, a plurality of facility transfer nodes, and a plurality of restoration nodes all interconnected for communication within the network;

a restoration system for restoring failed network nodes including:

means for specifying a number of facility transfer nodes and restoration nodes within any area of one of the network nodes, means for determining a given facility transfer node and a given restoration node to use in an area so that the total distance from each network node in the area to the given facility transfer node and given restoration node is minimized, means for performing restoration in the event of network node failure by bringing access traffic for the failed node to the given facility transfer node and then from the given facility transfer node to the given restoration node, means for bringing traffic from other network nodes which cross-connects with the access traffic to the failed network node's restoration node, and means for determining the restoration paths so that a minimum number of restoration links are used.

6. A network as in claim 5, wherein said performing means includes means for indicating the failed network node as failures of all the links to the failed network node, and for restoring as much of the traffic through the failed node with a predetermined use of reserve capacity.

7. A network as in claim 5, wherein said restoration means includes means for establishing a predetermined use of reserve capacity established on the basis of customer agreement.

8. A network as in claim 5, wherein said performing means includes means for testing for use of an established predetermined reserve capacity and for restoring as much of the traffic through the failed network node within the established predetermined reserve capacity.

* * * * *